(12) United States Patent
Mayer et al.

(10) Patent No.: US 8,157,291 B2
(45) Date of Patent: Apr. 17, 2012

(54) SAFETY ARRANGEMENT FOR A VEHICLE AND METHOD FOR CONTROLLING A SAFETY ARRANGEMENT

(75) Inventors: Johann Mayer, Petershausen (DE);
Thomas Schmidbauer, München (DE);
Thomas Wohllebe, Calberlah (DE);
Mark Gonter, Lehrte (DE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 12/863,307

(22) PCT Filed: Jan. 13, 2009

(86) PCT No.: PCT/EP2009/000131
§ 371 (c)(1), (2), (4) Date: Nov. 2, 2010

(87) PCT Pub. No.: WO2009/090030
PCT Pub. Date: Jul. 23, 2009

(65) Prior Publication Data
US 2011/0042926 A1    Feb. 24, 2011

(30) Foreign Application Priority Data

Jan. 19, 2008 (DE) .......................... 10 2008 005 272

(51) Int. Cl.
*B60R 21/2338* (2011.01)
*B60R 21/2342* (2011.01)
*B60R 21/263* (2011.01)
(52) U.S. Cl. ...................... 280/735; 280/742; 280/743.2
(58) Field of Classification Search .................. 280/735, 280/743.2; 701/45
See application file for complete search history.

(56) References Cited

U.S. PATENT DOCUMENTS

| 3,684,309 | A | | 8/1972 | Uchiyamada et al. |
| 3,861,710 | A | | 1/1975 | Okubo |
| 5,568,938 | A | * | 10/1996 | Lindstrom ................. 280/743.2 |
| 6,189,928 | B1 | | 2/2001 | Sommer et al. |
| 6,725,141 | B2 | * | 4/2004 | Roelleke ......................... 701/45 |

(Continued)

FOREIGN PATENT DOCUMENTS

DE          2103194          9/1971

(Continued)

OTHER PUBLICATIONS

International Search Report and Written Opinion of the ISA for PCT/EP2009/000131.

(Continued)

*Primary Examiner* — Drew Brown
(74) *Attorney, Agent, or Firm* — Harness, Dickey & Pierce, P.L.C.

(57) ABSTRACT

A safety arrangement for a motor vehicle includes an airbag and a crash sensor system. The airbag is normally folded together in a non-activated basic state and is able to be inflated with different volumes. The crash sensor system detects a vehicle impact and emits an activation signal. The crash sensor system includes both a pre-crash sensor system and also an in-crash sensor system, and emits a pre-crash activation signal as activation signal upon detection of an impending collision. The in-crash sensor system detects an actual impact and emits an in-crash activation signal (backup) if the pre-crash sensor system has previously not detected the impending collision and has not emitted a pre-crash activation signal. The airbag may be inflated to a larger airbag volume and to a relatively smaller airbag volume in an in-crash mode.

15 Claims, 7 Drawing Sheets

U.S. PATENT DOCUMENTS

| | | | |
|---|---|---|---|
| 7,261,320 B2 * | 8/2007 | Fredin et al. | 280/743.2 |
| 7,354,064 B2 * | 4/2008 | Block et al. | 280/743.2 |
| 2002/0096871 A1 * | 7/2002 | Pinsenschaum et al. | 280/743.2 |
| 2002/0125706 A1 * | 9/2002 | Greib et al. | 280/743.2 |
| 2002/0166710 A1 | 11/2002 | Breed | |
| 2003/0105569 A1 * | 6/2003 | Roelleke | 701/45 |
| 2004/0046376 A1 * | 3/2004 | Ryan | 280/743.2 |
| 2005/0057027 A1 * | 3/2005 | Fogle et al. | 280/739 |
| 2005/0065688 A1 * | 3/2005 | Rao et al. | 701/45 |
| 2005/0156411 A1 | 7/2005 | Steffens et al. | |
| 2005/0187683 A1 * | 8/2005 | Miki et al. | 701/45 |
| 2006/0170202 A1 | 8/2006 | Block et al. | |
| 2008/0054608 A1 * | 3/2008 | Bito et al. | 280/735 |
| 2009/0008913 A1 | 1/2009 | Breuninger et al. | |
| 2009/0008914 A1 | 1/2009 | Breuninger et al. | |

FOREIGN PATENT DOCUMENTS

| | | |
|---|---|---|
| DE | 2256146 | 6/1973 |
| DE | 4426090 C2 | 7/1995 |
| DE | 19620886 A1 | 11/1997 |
| DE | 29805217 U1 | 7/1998 |
| DE | 19806773 A1 | 9/1998 |
| DE | 19740020 A1 | 3/1999 |
| DE | 10107273 A1 | 8/2002 |
| DE | 102005001177 A1 | 9/2005 |
| DE | 102005009763 A1 | 9/2006 |
| DE | 102005031545 B4 | 1/2007 |
| WO | 2007/073944 A | 7/2007 |

OTHER PUBLICATIONS

German Search Report for priority document DE 10 2008 005 272.8, established Jul. 7, 2008.

English translation of the International Preliminary Report on Patentability, issued Aug. 10, 2010, incorporating the English translation of the Written Opinion of the ISA.

* cited by examiner

SAFETY ARRANGEMENT FOR A VEHICLE AND METHOD FOR CONTROLLING A SAFETY ARRANGEMENT

CROSS-REFERENCE TO RELATED APPLICATIONS

This application is a 371 U.S. National Stage of International Application No. PCT/EP2009/000131, filed Jan. 13, 2009. This application claims priority to German Patent Application No. DE 102008005272.8, filed Jan. 19, 2008, which application is herein expressly incorporated by reference.

FIELD OF THE INVENTION

The invention relates to a safety arrangement for a vehicle, in particular for a motor vehicle, and a method for controlling such a safety arrangement.

Safety arrangements are known for a vehicle, in particular for a motor vehicle with an airbag, which is folded together in the non-activated basic state, which with a triggering of the safety arrangement by an activation signal, is inflatable in the direction of the interior of the vehicle by means of a gas generator. For this, a crash sensor system is present, which detects a vehicle impact and emits the activation signal. It is further known here to adapt the filling extent and the airbag volume to detected occupant parameters and/or the severity of an accident, for an optimization of the restraining effect and a reduction of the aggressiveness of the airbag.

An actual airbag arrangement is known for this (DE 198 06 773 A1), in which to reduce the aggressiveness of the airbag with respect to vehicle occupants who are situated in a so-called "out-of-position" posture, a pre-chamber is provided before the gas inlet into the airbag. In this pre-chamber, a gas flow control unit is arranged, by which the intensity and/or the direction of the gas volume flow, delivered from a gas generator, is able to be influenced.

Such airbag safety arrangements are further known in which in the activated airbag the filling extent and the internal pressure are able to be controlled variably in that a controllable gas outlet valve is provided as a so-called vent, by which in particular during the inflation process a gas outlet opening to the environment is created in line with specific objectives. It is known here to arrange a vent directly on the airbag and/or integrated in an airbag module housing (DE 10 2005 009 763 A1; DE 101 07 273 A1).

In addition, a generic safety arrangement is known (US 2006/0170202 A1), in which an airbag is able to filled to different volume sizes to adapt to the size of a vehicle occupant who is to be protected. This volume variability of the airbag is realized by means of limiting straps, which on the one hand are fastened to the inner side of an unfolding airbag wall and which on the other hand are able to be drawn out, respectively from a fixed guide opening, by the unfolding of the airbag and are able to clamped there with a correspondingly variable limiting strap length determining the volume of the airbag. In addition, a vent, coupled therewith mechanically, is provided which in a dual function carries out the limiting strap clamping and at the same time carries out the freeing of the vent opening.

It is an object of the invention to modify and further develop a generic safety arrangement for a vehicle, in particular for a motor vehicle, so that a high safety function is able to be achieved in connection with a pre-crash sensor system which is known per se.

SUMMARY

The crash sensor system of the vehicle comprises both a pre-crash sensor system and also an in-crash sensor system. The pre-crash sensor system generally already detects an impending collision before an actual impact and for this circumstance emits an activation signal as a pre-crash activation signal. Through the increasing use of driver assistance systems, sensors for monitoring the environment are also being increasingly incorporated in the vehicle, these sensors also being able to be used for a pre-crash sensor system. Advantageously, safety measures can thereby already be triggered in a controlled manner before a collision, in particular airbags and belt tensioners can be activated. According to the current prior art, a pre-crash sensor system indeed generally detects an impending collision, with this detection, however, not being one hundred percent. Therefore, a combination with the hitherto usual in-crash sensor system as a backup is proposed, which detects an actual impact and for this circumstance emits an in-crash activation signal if the pre-crash sensor system has not previously detected the impending collision and has not emitted a pre-crash activation signal. It is further proposed according to the invention that the airbag is able to be inflated with different airbag volumes, wherein by a pre-crash activation signal in a pre-crash mode, the inflation process is activated for the greater airbag volume and by an in-crash activation signal in an in-crash mode, the inflation process for the relatively smaller airbag volume is activated.

The invention is therefore based on the realization that in a pre-crash triggering of the safety arrangement, a different design of the system is possible than hitherto, wherein in the pre-crash mode the airbag volume is to be substantially greater than the airbag volume of the standard airbag hitherto. The advantages of the pre-crash triggering in connection with a greater airbag volume consist in particular in that:

Through the relatively greater airbag volume in connection with the pre-crash triggering, the vehicle occupant who is to be protected can already be effectively supported by the airbag at the start of his forward displacement which is caused by the collision.

The energy absorption of the relatively larger airbag is better.

The restraining effect of a safety belt and of the relatively larger airbag in connection with the pre-crash triggering can be coordinated better with each other.

The supporting of a vehicle occupant by the relatively larger airbag is, as a whole, over a larger area, also resulting in an improved protection in an oblique impact.

A vehicle occupant sitting bent slightly forward can be pressed back gently into the seat by the relatively larger airbag in a pre-crash triggering.

Through the pre-crash triggering of the airbag, a comparatively longer inflation time is available, which can be used for filling the larger airbag volume, wherein in addition the unfolding speed and hence the aggressiveness of the airbag with respect to an occupant can be reduced.

As a backup, if the pre-crash sensor system does not detect an impending collision, for example through adverse ancillary conditions of the sensor, a triggering of the airbag by the in-crash sensor system is, however, still imperatively necessary, which, however, requires a relatively smaller airbag volume corresponding to a current standard airbag. This requirement is met in that the airbag which is used is able to be filled with a variable volume according to a pre-crash mode or an in-crash mode.

In a preferred embodiment, the smaller airbag volume is therefore to correspond to the airbag volume of a standard airbag hitherto, and the larger airbag volume for the pre-crash mode can be substantially larger compared with this, in particular greater by a factor 1.3 to 2.0. Depending on the conditions, the airbag volume can be variable in a controlled manner between a minimum volume and a maximum volume and also for intermediate sizes, whereby improved fine adjustments are possible.

In a further embodiment, a gas outlet valve is provided as controllable vent for adaptation of the internal pressure of the airbag. In the pre-crash mode, in addition the inflation process is carried out with a longer inflation time compared with an in-crash mode, whereby inter alia the aggressiveness of the airbag is reduced.

In a first actual preferred design, the volume variability of the airbag is realized by means of limiting straps. These are on the one hand fastened on the inner side of an unfolding airbag wall, and on the other hand are able to be drawn by a free end, by the unfolding of the airbag, respectively out from a fixed guide opening. There, they are then able to be clamped in a controlled manner with a correspondingly variable active limiting strap length, determining the desired airbag volume. In addition, to adapt the internal pressure of the airbag, the controllable vent is integrated in the airbag module housing. The controllable vent is also used to discharge the excess amount of gas in the in-crash mode with the smaller airbag volume.

The opening of the vent can take place here by displacing a valve part, freeing at least one gas outlet opening, preferably by a pyrotechnic drive, wherein in a dual function a clamping device for clamping the limiting strap is coupled therewith directly or indirectly and is actuated. Such a valve part can in particular be a valve slider on the module housing which is adjustable in a pyrotechnically controlled manner.

In a further actual embodiment, the controllable vent can be formed by a housing wall region of the module housing which is able to be displaced in a pyrotechnically controlled manner, wherein here also a limiting strap clamping is to be coupled with the displacement.

In a second alternative actual design, the volume variability of the airbag is realized by open means of tucked-in folds with tear seams and/or tear seam fields. Here, the tear seams and/or the tear seam fields do not tear open, or only tear open partially for a relatively small airbag volume. On reaching a particular airbag internal pressure or on reaching particular air bag internal pressure stages, on the other hand, the tear seams tear open as a whole or in stages for an unfolding of a larger airbag volume. Also in this design and in this embodiment, a gas outlet valve is provided as a controllable vent for adapting the internal pressure of the airbag, said vent being preferably integrated in the module housing. The vent can be constructed concretely corresponding to the above first limiting strap design, wherein, however, in the present tear seam design no limiting straps are used and therefore no clamping device is provided.

In all the above embodiments, preferably a single-stage gas generator is used as gas generator, wherein the filling adaptations are carried out via the controllable vent.

In a preferred further development and modified embodiment of the safety arrangement, a first vent is integrated in the module housing, which to control the gas mass flow is able to be activated for filling the airbag in the pre-crash mode with a large airbag volume (A+B) or in the in-crash mode with a smaller airbag volume (A). In addition, a second vent is preferably integrated in the airbag and is able to be triggered pyrotechnically, which is able to be activated for an adaptivity of the airbag, in particular an adaptation of the airbag pressure to the severity of the accident and/or to occupant parameters. Therefore, the control for the size of the airbag volume, which is respectively associated with the pre-crash mode or the in-crash mode, is able to be uncoupled from the control of the adaptivity of the airbag and is associated with two vents. Thereby, such a control as a whole is able to be handled more easily and if applicable is able to be carried out more precisely and specifically.

The method for controlling the safety arrangement according to the first design with the limiting straps is embodied so that in the pre-crash mode, when a pre-crash activation signal is present, the limiting straps remain freely unclamped, and by activation of the gas generator the airbag is filled with a large airbag volume, with the vent remaining closed during the inflation process. In an embodiment of the control, additionally or alternatively, the vent can be at least partially opened if applicable after or during the inflation process for adaptation of the airbag characteristic to the severity of the accident and/or to occupant parameters. If an impending collision was not detected and therefore an in-crash mode is present, the vent is opened early for filling a relatively smaller airbag volume during the inflation process, and at the same time to limit the volume of the airbag, the limiting straps are clamped. Here, also, an appreciable adaptivity can be carried out by a variation of the moment of activation of the vent and of the limiting strap clamping, in particular for an adaptation of the airbag volume to the severity of the accident or to occupant parameters. In the present first design as stated above, the adaptivity can be controlled exclusively or additionally by a second vent which is preferably integrated in the airbag.

In the control method for the second design with the airbag volume variability by tear seams and/or tear seam fields, in the pre-crash mode with the presence of a pre-crash activation signal with a closed vent, firstly the small airbag volume is filled. On reaching a particular internal pressure of the airbag, the tear seams and/or the tear seam fields tear open, whereby the large airbag volume is filled. In an embodiment of the control, additionally or alternatively, the vent can be at least partially opened if applicable after or during the inflation process for adaptation of the airbag characteristic to the severity of the accident and/or to occupant parameters. In the in-crash mode, on the other hand, for filling a relatively smaller airbag volume, the vent is already opened early during the inflation process, wherein by a controlling of the vent opening, in line with specific objectives, in particular of the moment of activation and/or of the freed size of a vent opening, an adaptivity, in particular to the severity of an accident or to occupant parameters is able to be carried out. A controlling of the adaptivity is also able to be carried out by means of a second vent in the second design.

BRIEF DESCRIPTION OF THE DRAWINGS

The invention is explained in further detail with the aid of a drawing, in which are shown.

DETAILED DESCRIPTION

Figure 1:
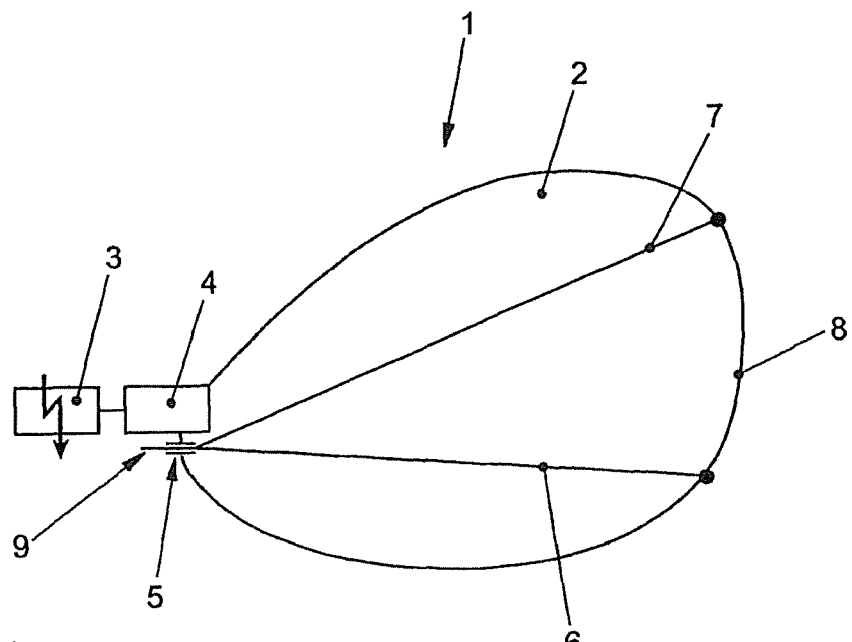
FIG. 1 a diagrammatic illustration of a safety arrangement with an airbag triggered by a pre-crash sensor system, FIG. 2 the safety arrangement according to FIG. 1 with the airbag triggered by an in-crash sensor system, with an airbag volume reduced by a limiting strap clamping, FIG. 3 a first embodiment of a vent construction with coupled limiting strap clamping, FIG. 4 a second embodiment of a vent construction with coupled limiting strap clamping, FIG. 5 a third embodiment of a vent construction with coupled limiting strap clamping in a diagrammatic side section view, FIG. 6 the arrangement according to FIG. 5 in a top view, FIG. 7 a flow diagram of the control sequence in an embodiment with limiting strap clamping, FIG. 8 a safety arrangement with a second design for a volume-variable airbag, FIG. 9 an airbag embodiment for the safety arrangement according to FIG. 8 in a top view with tear seams, FIG. 10 an airbag embodiment for the safety arrangement according to FIG. 8 in a top view with tear seam fields, FIG. 11 a flow diagram of the control sequence in an embodiment of the airbag with tear seams, and FIG. 12 a diagrammatic illustration of an embodiment of the safety arrangement with two controllable vents.
Figure 2:
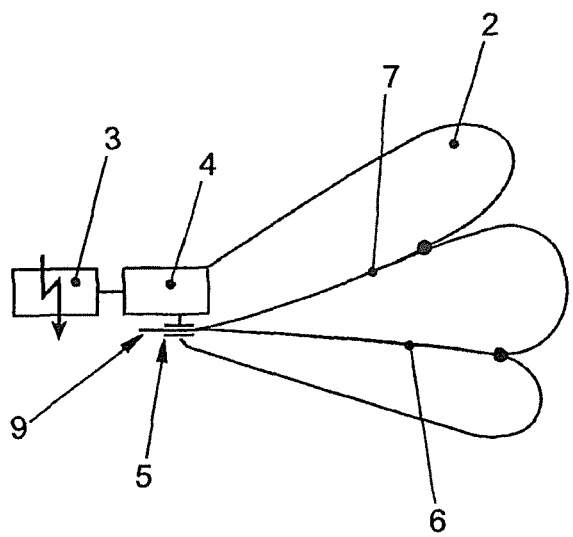

In FIGS. 1 and 2, the same safety arrangement 1 is shown in diagrammatic illustration, with a volume-variable airbag 2, which is respectively already filled via a single-stage gas generator 3, wherein a vent 4 with a limiting strap clamping device 5 cooperates with the gas generator 3.

To realize different airbag volumes, two limiting straps 6, 7 are used here, which on the one hand are fastened to the inner side of an airbag wall region 8, unfolding towards an occupant, and on the other hand are able to be drawn out from a clampable guide opening 9 of the limiting strap clamping device 5.

In FIG. 1 the triggering of the airbag was carried out via a pre-crash sensor system (not illustrated) (see left-hand branch in the sequence diagram according to FIG. 7), wherein the airbag 2 was filled with its full large volume without limiting strap clamping.

In FIG. 2 on the other hand, the airbag triggering was activated as a backup with an in-crash sensor system (not illustrated), wherein the limiting straps 6, 7 were clamped in a shortened state in the guide opening 9 with the limiting strap clamping 5 for a relatively smaller airbag volume compared with FIG. 1. For adaptation of the internal pressure, the vent 4 was also opened prematurely for this (see right-hand branch in the sequence diagram according to FIG. 7).

Figure 3:
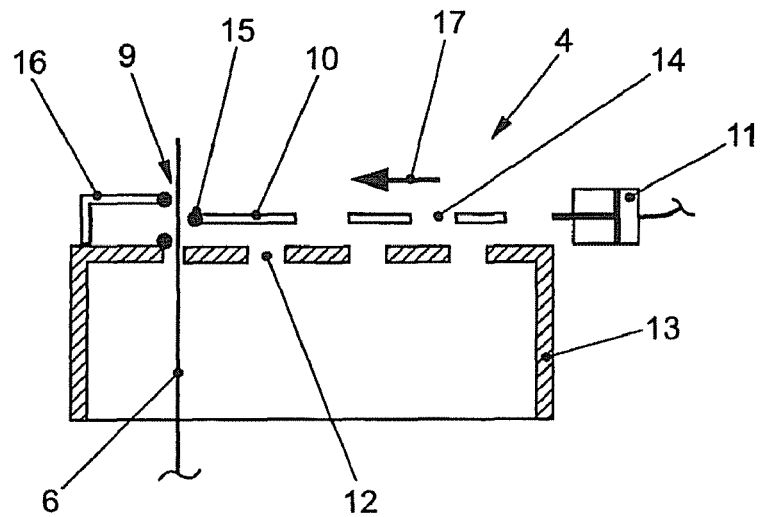

In a concrete first embodiment according to FIG. 3, the controllable vent 4 is embodied by a linearly displaceable valve slider 10, which is able to be actuated by means of a pyrotechnic drive 11. With a displacement of the valve slider 10 from a basic position into its functional position, gas outlet openings 12 on a module housing 13 and gas outlet openings 14 on the valve slider 10 are pushed over each other, so that a passage of gas is possible from the module housing 13 to the environment.

The guide opening 9 for a limiting strap 6 is realized in the region of the free valve slider end 15 and of an associated clamping plate 16. Evidently, with a displacement of the valve slider 10 into its functional position (arrow 17), in addition to the opening of the gas outlet openings 12, 14 the limiting strap 6 is clamped by the valve slider end 15 in the clamping plate 16 in the currently drawn out length.

Figure 4:
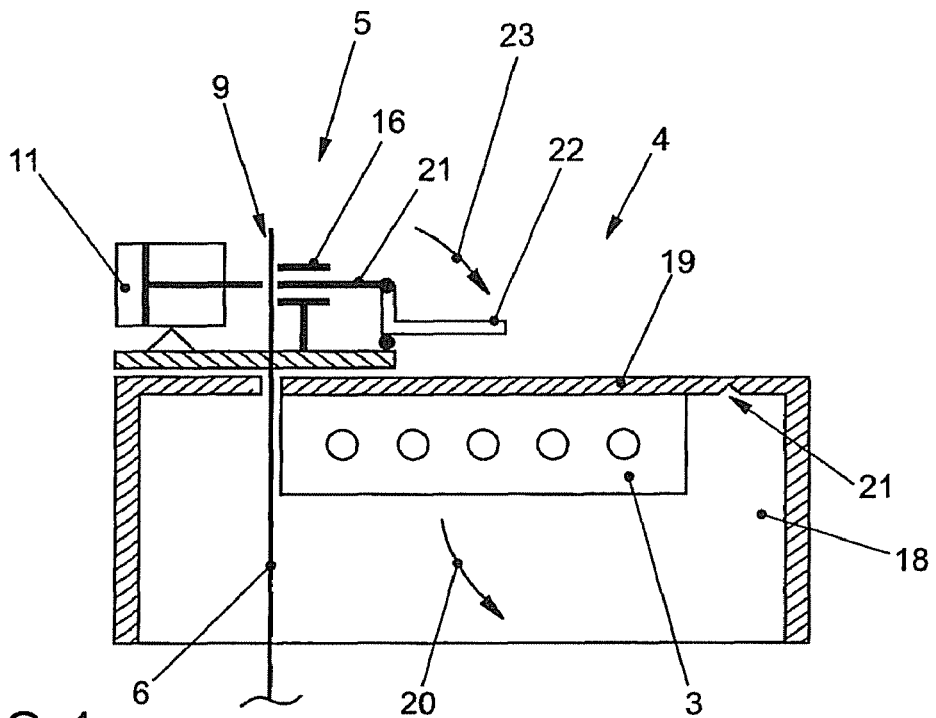

A second embodiment, alternative to this, of a vent 4 with coupled limiting strap clamping device 5 is illustrated in FIG. 4. For this, a module housing 18 is used, in which the gas generator 3 is arranged on a pivotable wall region 19. For an actuatable pivoting of the wall region 19 (arrow 20), a thinning of material as film hinge 21 is provided, wherein the vent function is realized by a pivoting, by a slit being thereby freed in the module housing 18 as a gas outlet opening. The pivoting also takes place here via a pyrotechnic drive 11 by means of a piston rod 21, which pivots an angle lever 22 (arrow 23), and which in turn brings about the pivoting of the wall region 19.

The guide opening 9 for the limiting strap 6 is formed by a hole in the piston rod 21. With a displacement of the piston rod 21, the guide opening 9 arrives with the limiting strap 6 into a piston rod guide as clamping plate 16, so that thereby the limiting strap 6 is clamped and fixed with the current limiting strap length.

Figure 5:
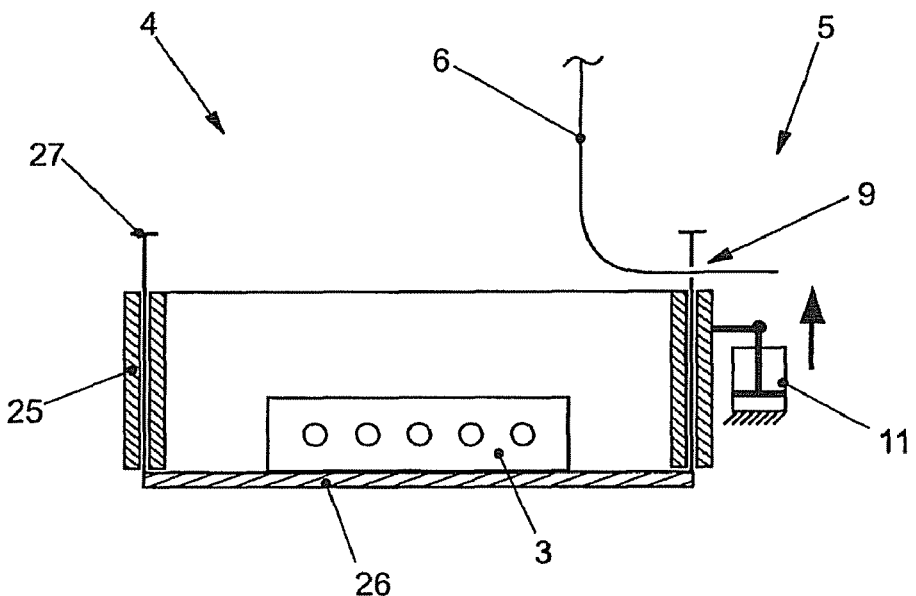
Figure 6:
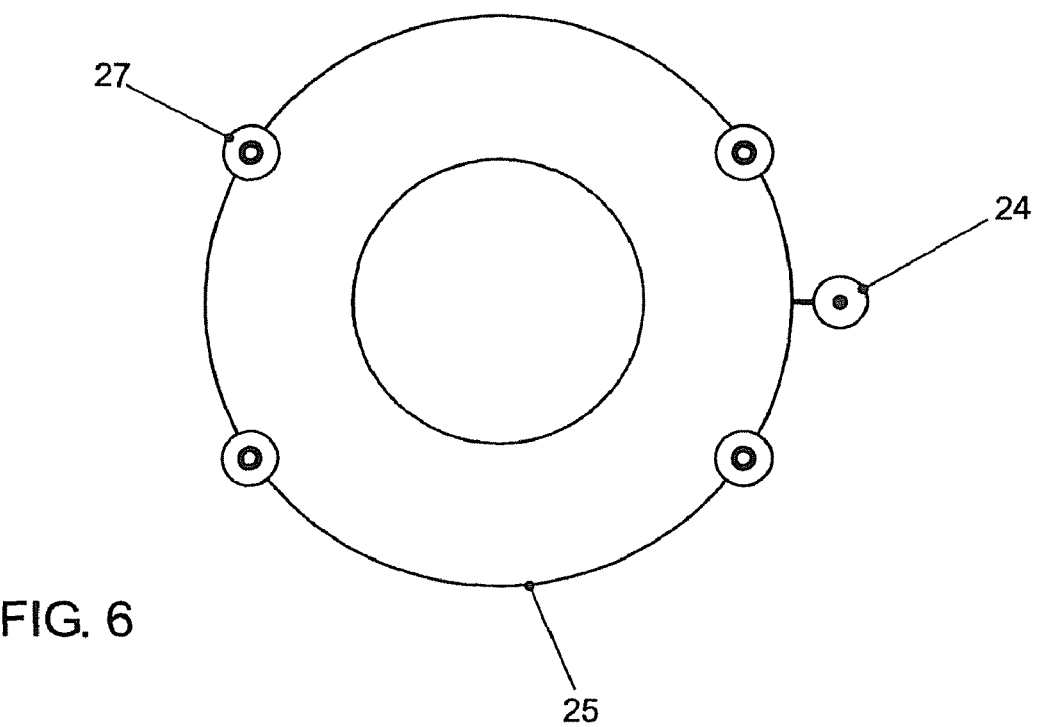

An alternative third embodiment of a vent 4 in connection with a limiting strap clamping device 5 is shown in a diagrammatic side section illustration in FIG. 5 and in a top view in FIG. 6: a pyrotechnic drive 11 is again used for this, by which a cylindrical housing wall region 25 is displaceable up to stops 27 for the freeing of gas outlet openings with respect to a module base plate 26 with gas generator 3. A limiting strap 6 is guided freely through a guide opening 9 on a fixed module housing part. With a displacement of the housing wall region 25, the guide opening 9 is passed over with the limiting strap 6, so that the limiting strap 6 is fixed in the current limiting strap length. The tolerances of the guide openings are dimensioned here so that the limiting strap 6 is indeed clamped but is not sheared off.

Figure 7:
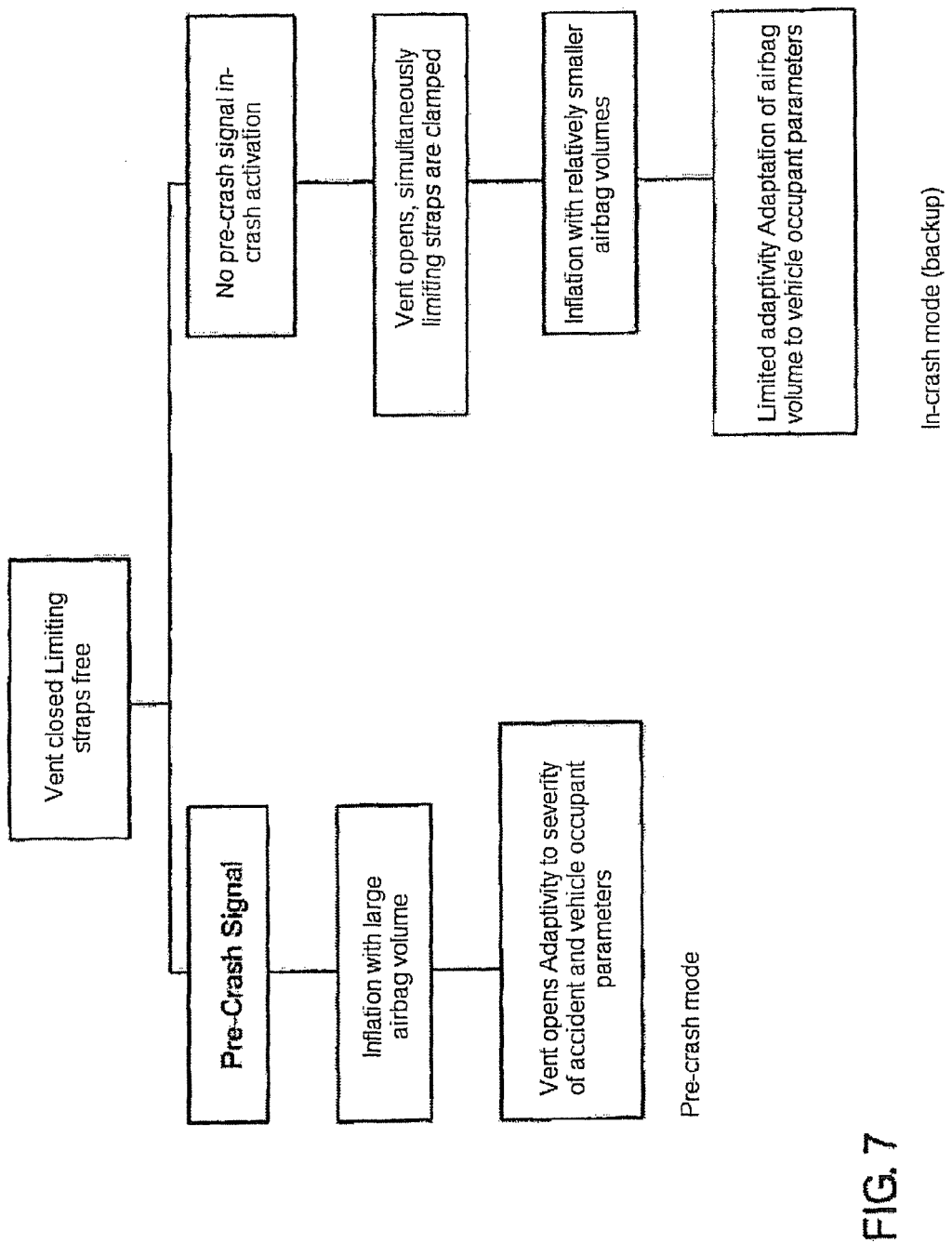

The sequence of the control is shown in the diagram according to FIG. 7, wherein one proceeds respectively from a basic state with closed vent and free limiting straps. In the left-hand branch of the diagram, the sequence is indicated in the pre-crash mode, and in the right-hand diagram in the in-crash mode (backup).

Figure 8:
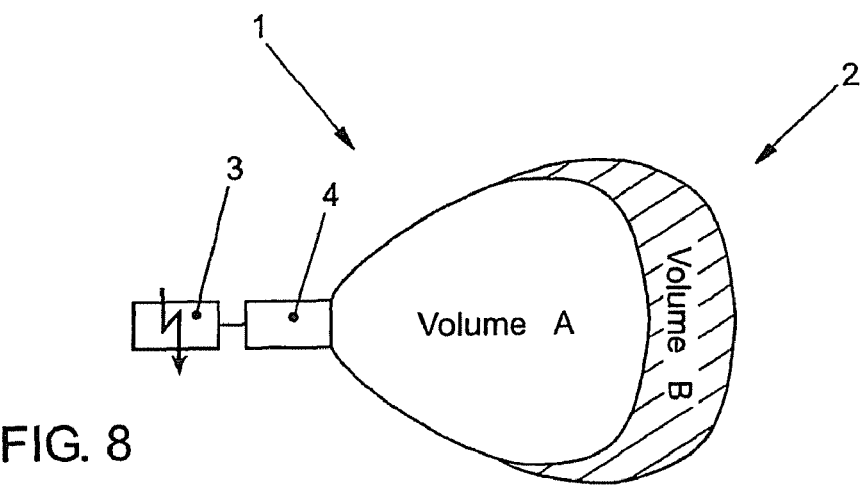

In FIG. 8 a safety arrangement is illustrated according to FIG. 1, but with a different design for a volume-variable airbag 2. Here, also, a gas generator 3 and a controllable vent 4 are provided. The vent 4 can also be embodied in this design similarly to the concrete embodiments according to FIGS. 3 to 6, wherein, however, the limiting strap clamping device 5 is dispensed with, because the volume variability is realized without limiting straps in this design.

In FIG. 8 a smaller volume A is illustrated, which is produced in the in-crash mode or as the first filling stage in the pre-crash mode, wherein the volume area B is further added to increase the volume.

Figure 9:
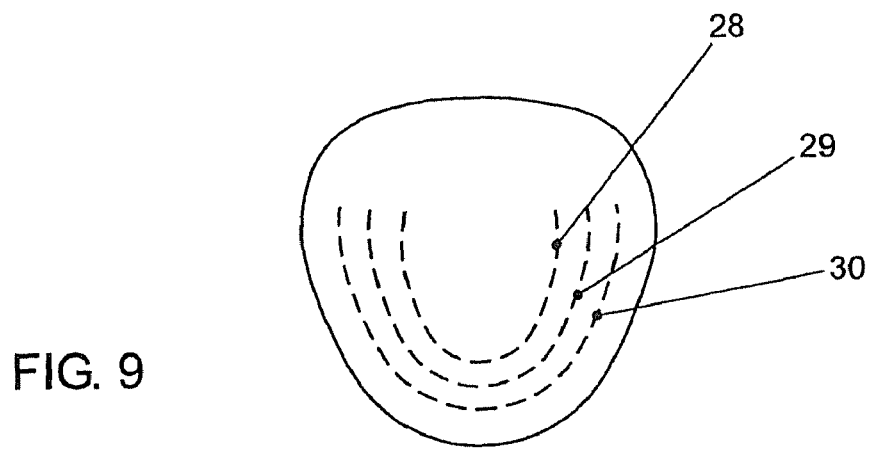
Figure 10:
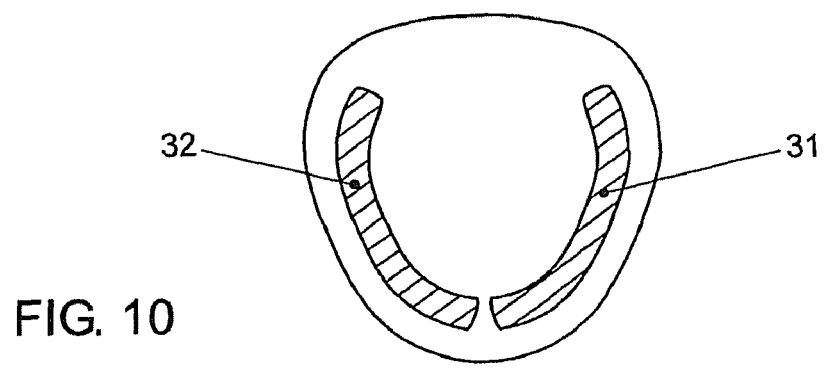

This is achieved in the pre-crash mode in that spaced-apart tear seams 28, 29, 30 on tucked-in folds according to FIG. 9, or tear seam fields 31, 32 according to FIG. 10, tear open on reaching a particular internal pressure of the air bag, together or in stages for an unfolding up to the large airbag volume A+B. The tear seams 28, 29, 30 or tear seam fields 31, 32 can be arranged at different locations and with different shapes according to the conditions.

Figure 11:
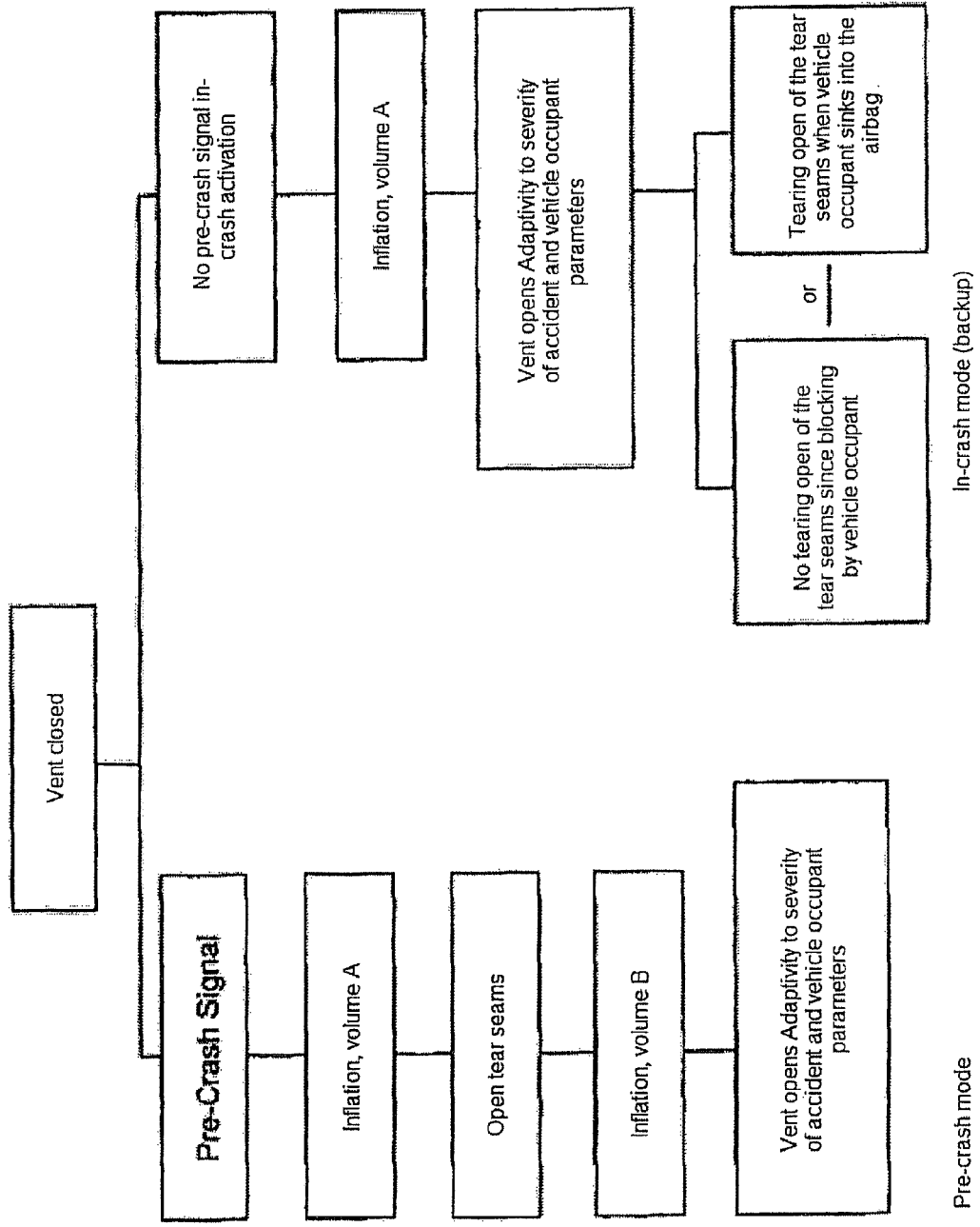

In the diagram according to FIG. 11, the sequence of airbag triggering is illustrated for the airbag design according to FIGS. 8 to 10: here, one proceeds respectively from a closed vent. The left-hand branch of the diagram shows the sequence in the pre-crash mode with a filling to the large airbag volume A+B. The right-hand branch of the diagram, on the other hand, shows the sequence in the in-crash mode with a filling of the smaller airbag volume A.

Figure 12:
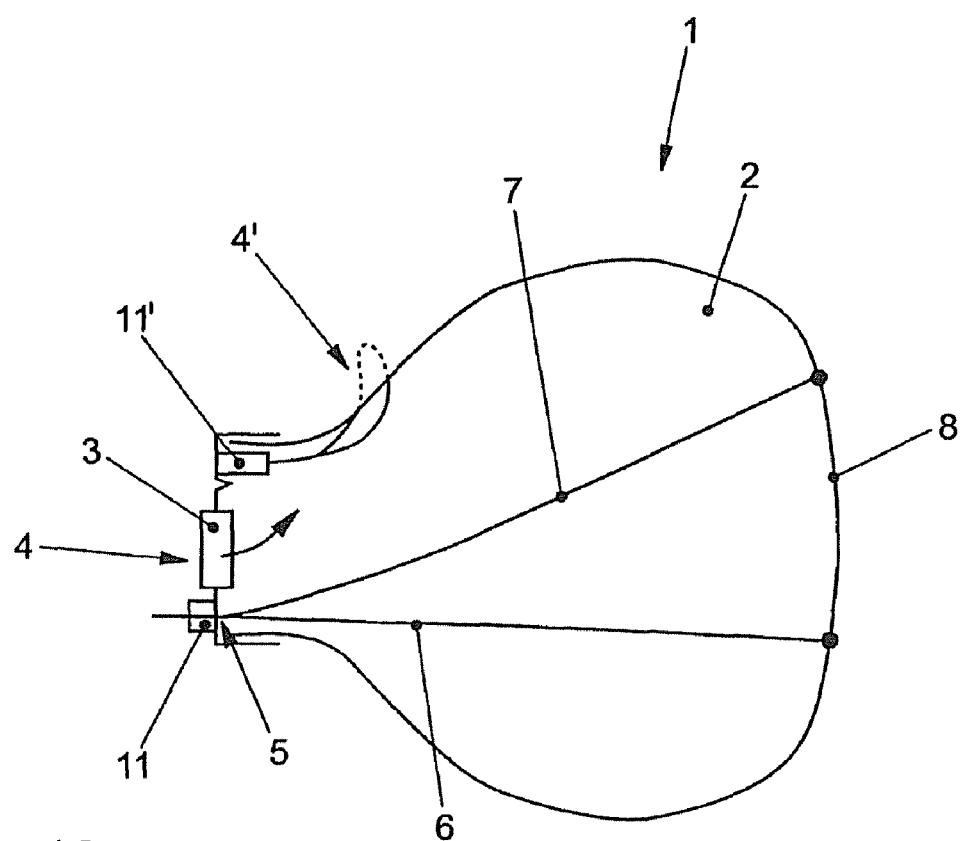

In a modified further development of a safety arrangement 1 according to FIG. 12, the basic construction according to FIGS. 1 and 2 is used, with an airbag 2, a gas generator 3, a vent 4 and a limiting strap clamping 5 and with limiting straps 6 and 7, which are fastened to an airbag wall region 8. The vent 4 with the limiting strap clamping device 5 is only illustrated diagrammatically, but is to actually correspond to the embodiment according to FIG. 4, wherein the vent opening takes place pyrotechnically by folding away the gas generator 3 or respectively a module wall region 19 coupled with a limiting strap clamping. The activation of this first vent 4 takes place in allocation to a pre-crash mode or in-crash mode.

In addition here in the airbag wall region 8, a second vent 4' is arranged, which is able to be activated independently of the first vent 4 via the pyrotechnic element 11' to control the adaptivity of the airbag 2, in particular for adapting to the severity of the accident and to occupant parameters.

LIST OF REFERENCE NUMBERS

1 Safety arrangement
2 Airbag
3 Gas generator
4, 4' Vent
5 Limiting strap clamping device
6 Limiting strap
7 Limiting strap
8 Airbag wall region
9 Guide opening
10 Valve slider
11, 11' Pyrotechnic drive
12 Gas outlet opening on the module
13 Module housing
14 Gas outlet opening on the vent
15 Valve slider end
16 Clamping plate
17 Arrow
18 Module housing
19 Wall region
20 Arrow
21 Piston rod
22 Angle lever
23 Arrow
25 Housing wall region
26 Module base plate
27 Stop
28 Tear seams
29 Tear seams
28 Tear seams
31 Tear seam fields
32 Tear seam fields
33 Tear seam fields

The invention claimed is:

1. A safety arrangement for a motor vehicle comprising:
   an airbag operable to be inflated with different volumes in a direction of an interior of the vehicle by a gas generator in response to an activation signal;
   a crash sensor system which detects a vehicle impact and emits the activation signal, the crash sensor system including a pre-crash sensor system and an in-crash sensor system, the pre-crash sensor system operable for detecting an impending collision before an actual impact and for this circumstance emitting a pre-crash activation signal as the activation signal, and the in-crash sensor system operable for detecting an actual impact and for this circumstance emits an in-crash activation signal if the pre-crash sensor system has previously not detected the impending collision and has not emitted a pre-crash activation signal;
   a first vent integrated in a module housing and able to be activated for controlling the gas mass flow for filling the airbag in the pre-crash mode with a large airbag volume or in the in-crash mode with a smaller airbag volume; and
   a second vent integrated in the airbag and able to be triggered pyrotechnically;
   wherein an inflation process for the larger airbag volume is activated by the pre-crash activation signal in a pre-crash mode, and the inflation process for the relatively smaller airbag volume is activated by the in-crash activation signal in an in-crash mode.

2. The safety arrangement according to claim 1, wherein the relatively smaller airbag volume corresponds to the airbag volume of a hitherto standard airbag and the larger airbag volume is substantially greater by comparison, in particular is greater by a factor 1.3 to 2.0.

3. The safety arrangement according to claim 1, wherein the airbag volume is variable in a controlled manner between a minimum volume and a maximum volume and also for intermediate sizes.

4. The safety arrangement according to claim 1, wherein the inflation process in the pre-crash activation is controlled with a longer inflation time compared with an in-crash triggering.

5. The safety arrangement according to claim 1, wherein the volume variability of the airbag is realized by limiting straps, which on the one hand are fastened on the inner side of an unfolding airbag wall and which on the other hand, through the unfolding of the airbag, are respectively able to be drawn out from a fixed guide opening and are able to be clamped there with a correspondingly variable limiting strap length determining the airbag volume, and the first vent integrated in the airbag module housing is also able to be actuated for airbag internal pressure adaptation.

6. The safety arrangement according to claim 5, wherein the vent opening takes place by displacement of a vent part freeing at least one gas outlet opening, preferably by pyrotechnics, and a clamping device for limiting strap clamping is coupled directly or indirectly therewith and able to be actuated.

7. The safety arrangement according to claim 6, wherein the controllable vent is formed by a valve slider, adjustable in a pyrotechnically controlled manner, on a module housing, which on displacement frees gas outlet openings on the module housing and at the same time clamps at least one limiting strap in a clamping plate, and/or
   that the controllable vent is formed by a housing wall region, displaceable in a pyrotechnically controlled manner, of a module housing, in particular a displaceable or pivotable housing wall region, on which the gas generator is preferably arranged, such that with a displacement a partial region of the module housing is opened, in particular by means of a tilting lever and/or on a linear guide, and at the same time at least one limiting strap is able to be clamped by the housing wall region or an actuating lever.

8. The safety arrangement according to claim 1, wherein the volume variability of the airbag is realized by tucked-in folds with tear seams and/or tear seam fields, wherein the tear seams and/or tear seam fields do not tear open or only partially tear open for a relatively small airbag volume, and on reaching a particular airbag internal pressure or on reaching particular airbag internal pressure stages, tear open in succession in stages for an unfolding of a larger airbag volume, and
   that for airbag internal pressure adaptation, a gas outlet valve is provided as controllable vent, which is preferably integrated in the module housing.

9. The safety arrangement according to claim 1, wherein the gas generator is a single-stage gas generator.

10. A method for controlling a safety arrangement having an airbag, an airbag housing and a crash sensor system, the crash sensor system having a pre-crash sensor system and an in-crash sensor system, the pre-crash sensor system operable for detecting an impending collision before an actual impact and emitting a pre-crash actuation signal, the in-crash sensor system operable for detecting an actual impact and emitting an in-crash activation signal, the method comprising:

selectively controlling the safety arrangement in one of a pre-crash mode and an in-crash mode;

wherein selectively controlling the safety arrangement in the pre-crash mode occurs in the presence of the pre-crash activation signal and includes inflating the airbag to a first airbag volume; and wherein selectively controlling the safety arrangement in the in-crash mode occurs in the presence of the in-crash activation signal, includes inflating the airbag to a second volume, the second volume being larger than the first volume, and further includes moving a control element from a first position to a second position to both vent gas from the airbag housing to the environment and clamp at least one tether associated with the airbag; and wherein the control element is a linearly displaceable valve slider having a plurality of first openings for aligning with a plurality of second openings of the airbag housing upon movement of the control element to the second position.

11. The method according to claim 10, wherein controlling the safety arrangement in the in-crash mode only occurs in the absence of a pre-crash actuation signal.

12. The method according to claim 10, wherein the control element is pyrotechnically moved from first position to the second position.

13. The method according to claim 10, wherein the valve slider clamps the tether in the second position.

14. A safety arrangement for a motor vehicle comprising:
an airbag operable to be inflated with different volumes in a direction of an interior of the vehicle by a gas generator in response to an activation signal, the airbag including a tether secured to an inner side of the airbag;
a housing module associated with the airbag, the housing module defining at least one module vent;
a crash sensor system which detects a vehicle impact and emits the activation signal, the crash sensor system including a pre-crash sensor system and an in-crash sensor system, the pre-crash sensor system operable for detecting an impending collision before an actual impact and for this circumstance emitting a pre-crash activation signal as the activation signal, and the in-crash sensor system operable for detecting an actual impact and for this circumstance emits an in-crash activation signal if the pre-crash sensor system has previously not detected the impending collision and has not emitted a pre-crash activation signal;
a pyrotechnically controlled element moveable from a first position to a second position in response to the in-crash activation signal, the pyrotechnically controlled element including at least one control element vent for aligning with the module vent when the pyrotechnically controlled element is in the second position;
wherein the airbag is able to be inflated to a larger airbag volume and to a relatively smaller airbag volume compared thereto, wherein an inflation process for the larger airbag volume is activated by the pre-crash activation signal in a pre-crash mode, and the inflation process for the relatively smaller airbag volume is activated by the in-crash activation signal in an in-crash mode; and
wherein the pyrotechnically controlled element clamps the tether in the second position.

15. The safety arrangement of claim 14, wherein the pyrotechnically controlled element is a valve slider.

* * * * *